(12) United States Patent
Rush et al.

(10) Patent No.: US 7,544,042 B2
(45) Date of Patent: Jun. 9, 2009

(54) INSERT WITH SLEEVE FOR A MOLDED IMPELLER

(75) Inventors: Eric W. Rush, Manchester, MO (US); Donald E. Morgan, Florissant, MO (US); S. Duke Snider, St. Louis, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 11/324,993

(22) Filed: Jan. 3, 2006

(65) Prior Publication Data

US 2007/0154313 A1 Jul. 5, 2007

(51) Int. Cl.
F04D 29/20 (2006.01)

(52) U.S. Cl. ............... 415/174.3; 416/244 R; 403/1; 403/267; 403/269; 29/527.2; 29/889.4; 264/274; 264/275; 264/279; 411/82; 411/903

(58) Field of Classification Search .......... 416/185, 416/186 R, 213 R, 213 A, 229 R, 234, 244 R, 416/241 A, 244 A; 415/174.3, 216.1; 403/1, 403/267, 269; 29/527.1, 527.2, 889.23, 889.4; 264/271.1, 274–275, 279; 470/2, 5; 411/82, 411/902, 903

See application file for complete search history.

(56) References Cited

U.S. PATENT DOCUMENTS

| | | | | |
|---|---|---|---|---|
| 3,228,342 A | * | 1/1966 | Page | 415/113 |
| 3,408,944 A | * | 11/1968 | Belonger et al. | 416/241 A |
| 3,594,102 A | * | 7/1971 | Oden | 416/244 R |
| 5,692,880 A | * | 12/1997 | Zelder | 416/185 |
| 6,003,195 A | * | 12/1999 | Whitney | 416/241 A |
| 6,533,540 B1 | * | 3/2003 | Mathis | 415/174.3 |

OTHER PUBLICATIONS

Yardley Products Corp Brochure, Catalog No. 2000, Rev Apr. 2004.*
Yardley® Products Corp., Yardley® Intro-Sert® Inserts web page, http://www.yardleyproducts.com/intro.htm, 2 pages, admitted prior art.
Yardley® Products Corp., Inserts Selection Guide web page, http://www.yardleyproducts.com/page2.htm, 2 pages, admitted prior art.
Yardley® Products Corp., Yardley® Standardized Molded-In Inserts web page, http://www.yardleyproducts.com/mold_c.htm, 2 pages, admitted prior art.

* cited by examiner

*Primary Examiner*—Christopher Verdier
(74) *Attorney, Agent, or Firm*—Senniger Powers LLP

(57) ABSTRACT

An impeller assembly includes a molded impeller and an insert within the impeller. The insert includes an unthreaded sleeve and a shoulder adjacent the sleeve for locating the impeller and the insert during manufacturing and installation. Methods of manufacturing and installing are also disclosed.

13 Claims, 8 Drawing Sheets

INSERT WITH SLEEVE FOR A MOLDED IMPELLER

BACKGROUND OF THE INVENTION

The present invention relates generally to molded impellers, and more particularly to a molded impeller having a locating insert therein.

Prior art pump impeller assemblies include an over-molded knurled insert for retaining and locating the impeller on a driveshaft. The insert includes internal threads that mate with external threads on the driveshaft and serve to locate the impeller relative to the driveshaft. It is important that the insert be properly positioned on the shaft because it locates the impeller, and such positioning, if incorrect, may reduce seal life, increase vibration and cause fluid leakage. However, prior art inserts, and the threads therein, do not satisfactorily locate the impeller on the driveshaft. This may be due in part to the difficulty of exactly controlling the location of thread surfaces. Moreover, the threads may not satisfactorily locate the impeller during molding of the impeller. The latter problem can cause eccentricity or "wobble" of the impeller during operation, necessitating a secondary machining operation or other measure to prevent contact of the impeller inlet with the pump housing. Such added manufacturing operations add to the cost of the impeller. In some cases a secondary seal ring must be added between the impeller and the housing, which again adds cost. Accordingly, an improved insert for the impeller is needed.

SUMMARY OF THE INVENTION

In one aspect, an impeller assembly comprises a molded impeller and an insert within the impeller. The insert includes an unthreaded sleeve and a shoulder adjacent the sleeve for locating the impeller and the insert.

In another aspect, a method of forming an impeller assembly in a mold comprises placing an insert over a positioning pin of the mold, the pin engaging a shoulder and a sleeve of the insert. Other steps include injecting a material into the mold for forming an impeller of the assembly and removing the positioning pin from the insert.

In still another aspect, the insert is mounted within the impeller for transmitting force to the impeller. The insert includes an outer surface and a plurality of protrusions extending outward from the outer surface and engaging portions of the impeller. The protrusions are sized and shaped to inhibit withdrawal of the insert from the impeller and for transmitting only radial force to the impeller so that substantially no axial force is transmitted to the impeller by the insert.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

Corresponding reference characters indicate corresponding parts throughout the drawings.

DESCRIPTION OF THE PREFERRED EMBODIMENTS

Figure 1:
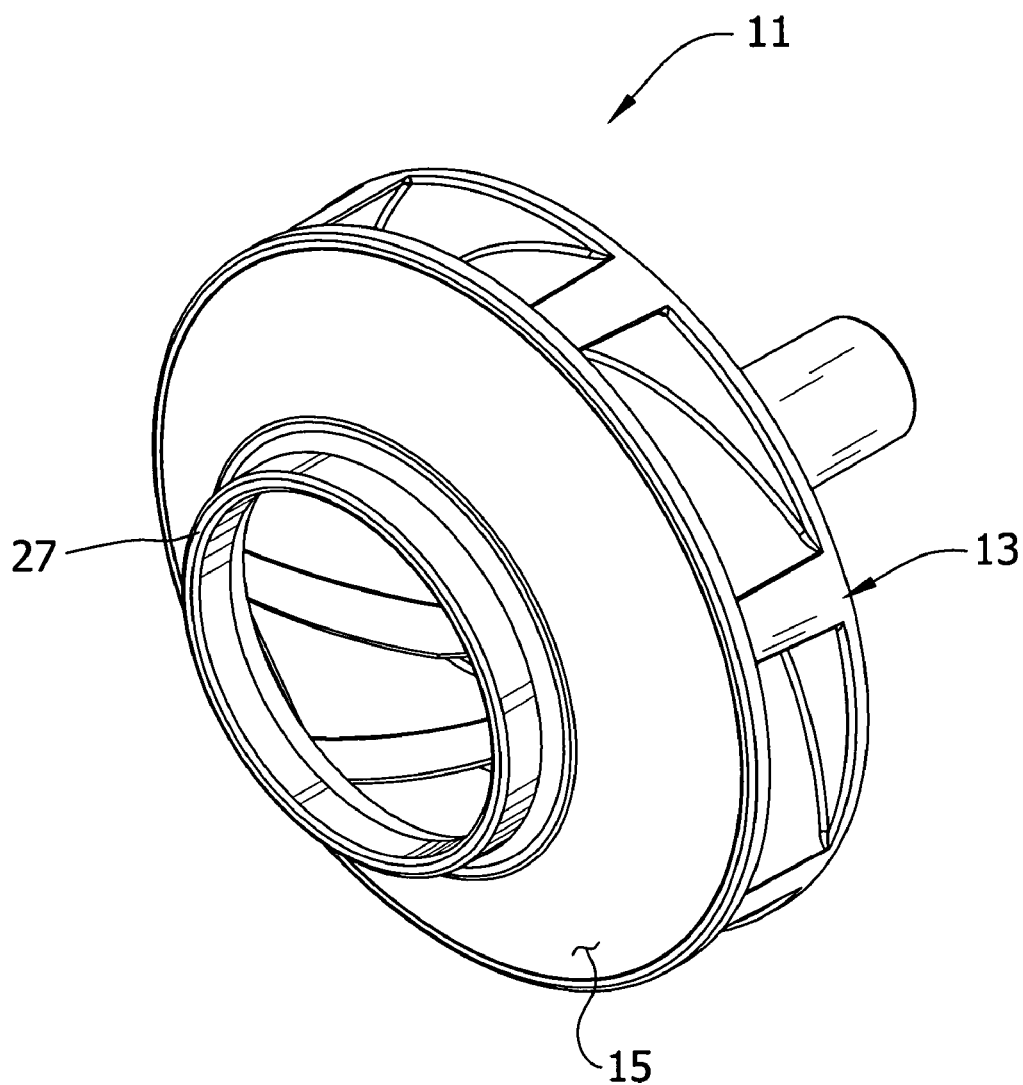
FIG. 1 is a front perspective of an impeller assembly of one embodiment.
Figure 2:
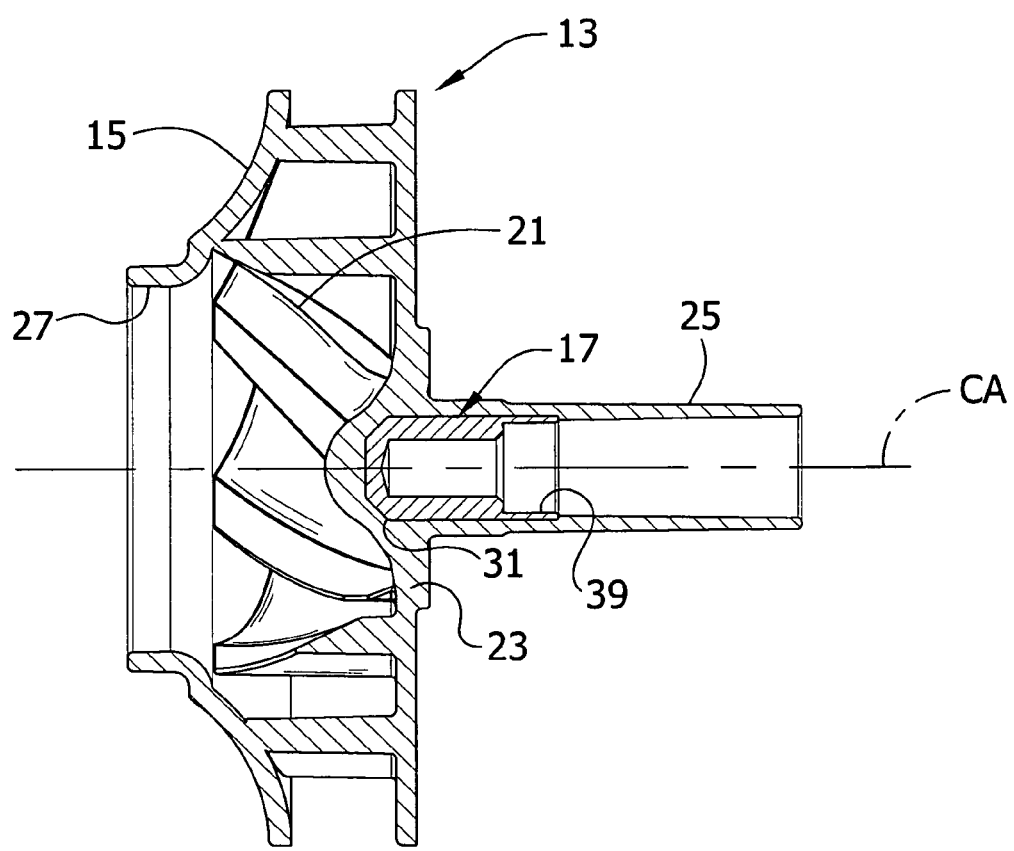
FIG. 2 is a section view of the assembly.
Figure 3:
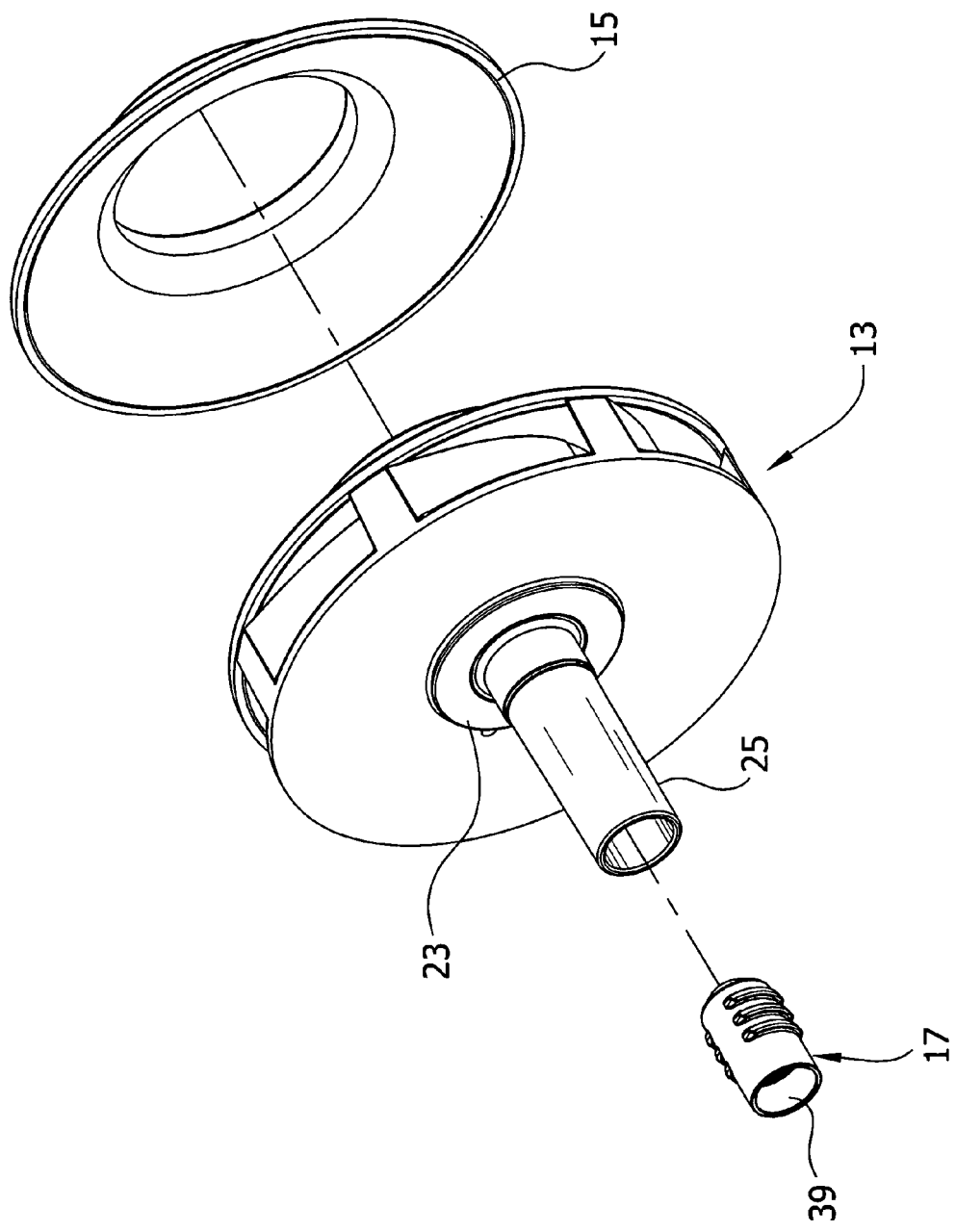
FIG. 3 is an exploded view of the assembly of FIG. 1 from a rear perspective.

Referring to FIGS. 1-3, an impeller assembly of one embodiment is generally designated 11 and generally comprises an impeller 13, a cap 15 and an insert 17. The impeller 13 includes blades 21, a hub 23 and a tube 25 extending from the hub. The cap 15 includes an inlet 27. It should be understood that this configuration of the impeller is merely an example of each, and many other configurations are contemplated within the scope of this invention.

Figure 4:
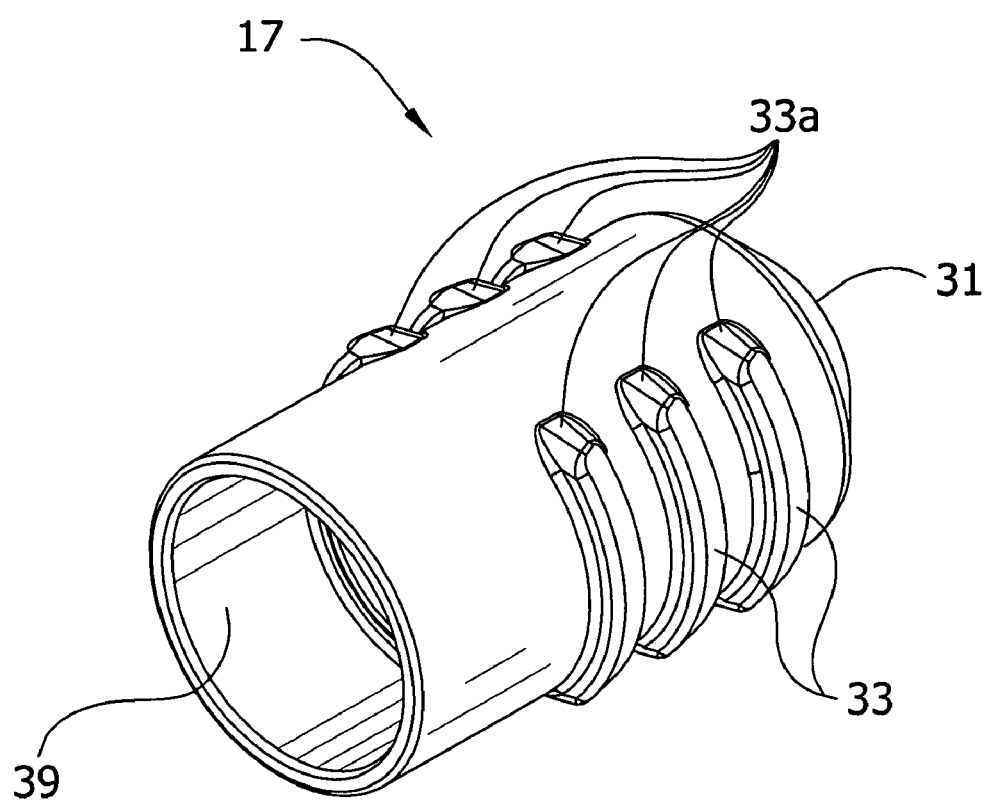
FIG. 4 is a perspective of an insert of the assembly.
Figure 5:
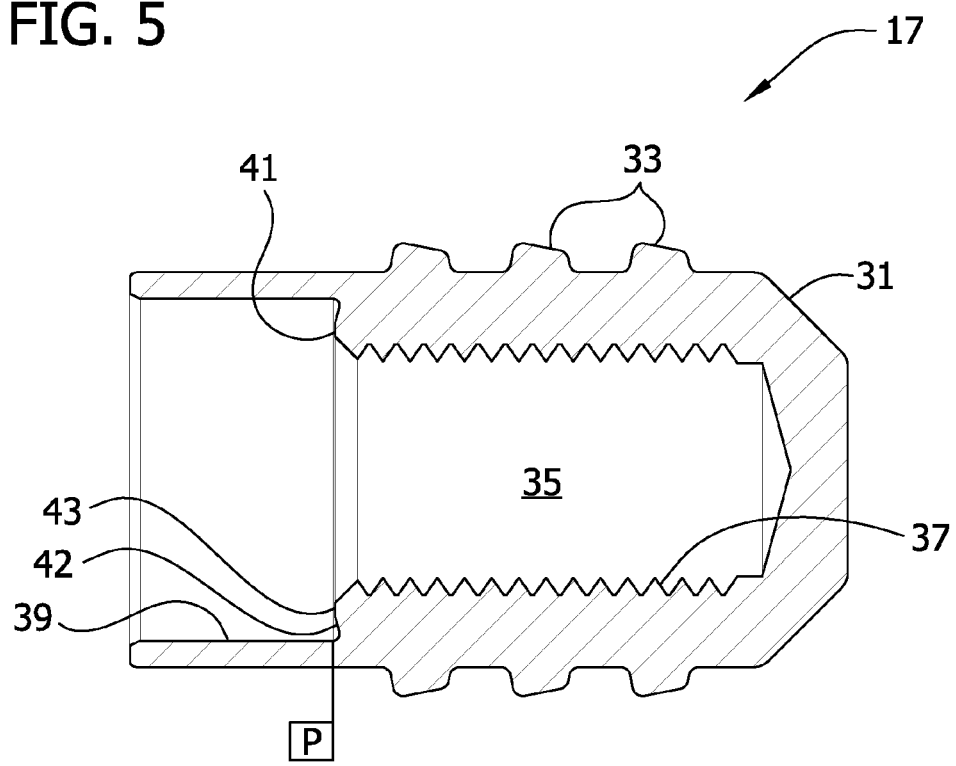
FIG. 5 is a section view of the insert.

Referring to FIGS. 2 and 4-5, the insert 17 of this embodiment is disposed in the tube 25 of the impeller 13. A nose 31 of the insert extends into the hub 23 of the impeller. The insert 17 includes a blind bore 35, i.e., the bore does not extend completely through the insert. An axis of the bore 35 defines a central axis CA of the insert and thus the impeller assembly 11. The walls of the bore 35 include a threaded, inward portion 37 and an unthreaded, outward portion or sleeve 39. A locating shoulder 41 extends between the two portions for locating the impeller 13 as described below. In this embodiment, the locating shoulder 41 forms a reference plane P. The shoulder includes a non-planar surface 42 and a planar contact surface 43 for contacting a tip of a positioning pin when the pin is received in the blind bore, the contact surface being spaced radially from the unthreaded interior surface by the non-planar surface and lying in the plane extending lateral to the bore axis.

The insert 17 of this embodiment is cylindrical in shape, an outer surface of the sleeve including a plurality of ribs 33 (or protrusions) extending therefrom. Broadly, the ribs engage portions of the impeller. The ribs 33 are sized and shaped to inhibit withdrawal of the insert from the impeller 13 and for transmitting only radial force to the impeller so that substantially no axial force is transmitted to the impeller by the insert. Each rib 33 of one embodiment includes an axially symmetric surface, e.g. surfaces 33a of FIG. 4, engaging the impeller to prevent an axial force from being transmitted to the impeller. The ribs 33 of this embodiment extend circumferentially on the outer surface, the ribs being symmetric and having no or substantially no surfaces angled relative to an axis of the insert so as to prevent an axial force being transmitted to the impeller. The ribs 33 may also be spaced apart axially (as shown) to further inhibit withdrawal of the insert.

The axial force caused by prior art inserts is undesirable because they may contribute to withdrawal of the insert 17 from the impeller 13, especially where a relatively large force is transmitted through the insert. In one example, the drive shaft forces the insert and impeller to go from 0 to 3600 RPM in 150 milliseconds. Such force causes a "cycling force" on the drive mechanism. In the prior art where the outer surface includes angled knurling on the outer surface, the angled knurling may cause an axial, rather than a purely radial force. In this embodiment, the ribs or protrusions are said to be "square" with the impeller so that all or substantially all the driving torque is torsional or radial and there is no or an insignificant amount of axial force that may damage the assembly.

In one embodiment of a suitable method for making the assembly, the insert 17 is placed over a positioning pin 45 of a portion 46 of an injection mold 47 prior to injection molding. The positioning pin 45 engages the sleeve 39 and the shoulder 41 and the pin contacts the planar contact surface 43. The positioning pin 45 is sized to fit snugly in the sleeve 39 so that the sleeve and shoulder 41 are precisely located and temporarily fixed relative to the positioning pin. The positioning pin 45 is likewise precisely located relative to the other portions of the mold 47. The material that will form the impeller 13 is injected into the die and around the insert 17.

After the material solidifies, the formed impeller 13 is fixed to the insert 17. Because the insert 17 cannot move relative to the pin, and because the impeller 13 becomes fixed to the insert during molding, the potential for "float" during molding is eliminated.

Figure 6:
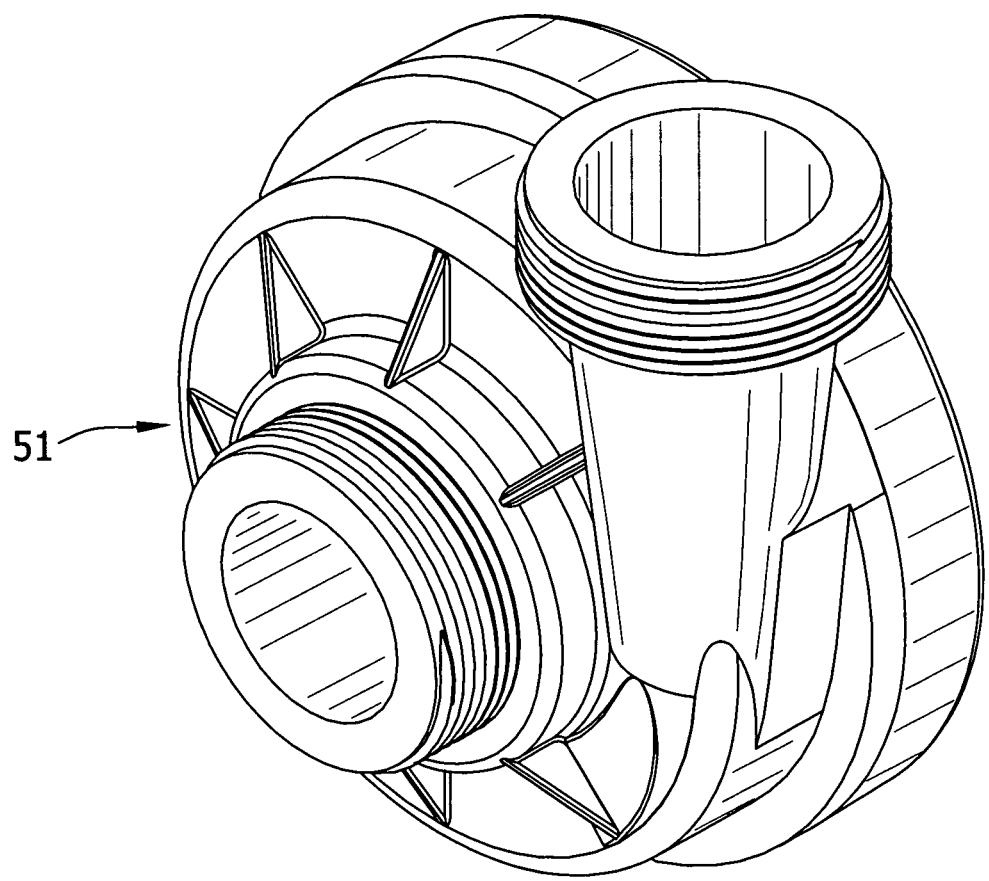
FIG. 6 is a front perspective of a pump housing that includes an impeller assembly of one embodiment.
Figure 7:
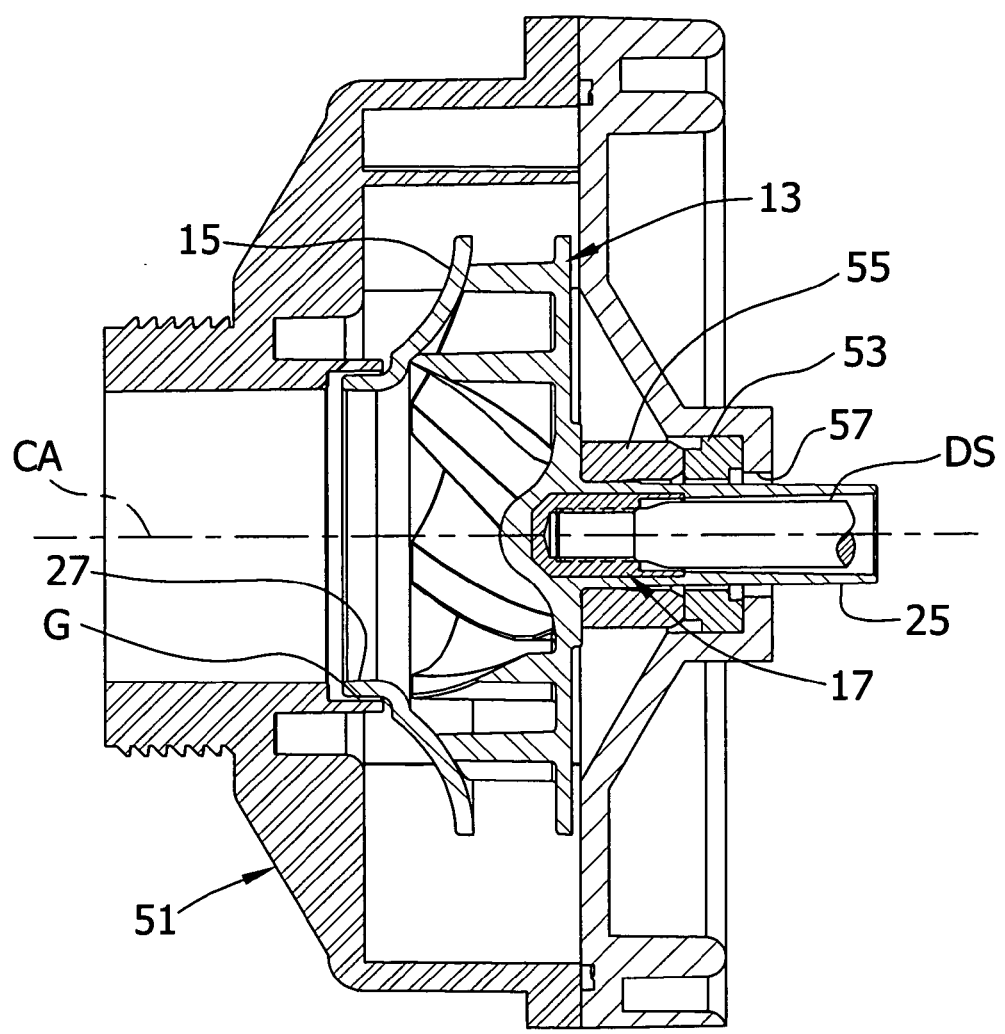
FIG. 7 is a section view of the pump housing.
Figure 8:
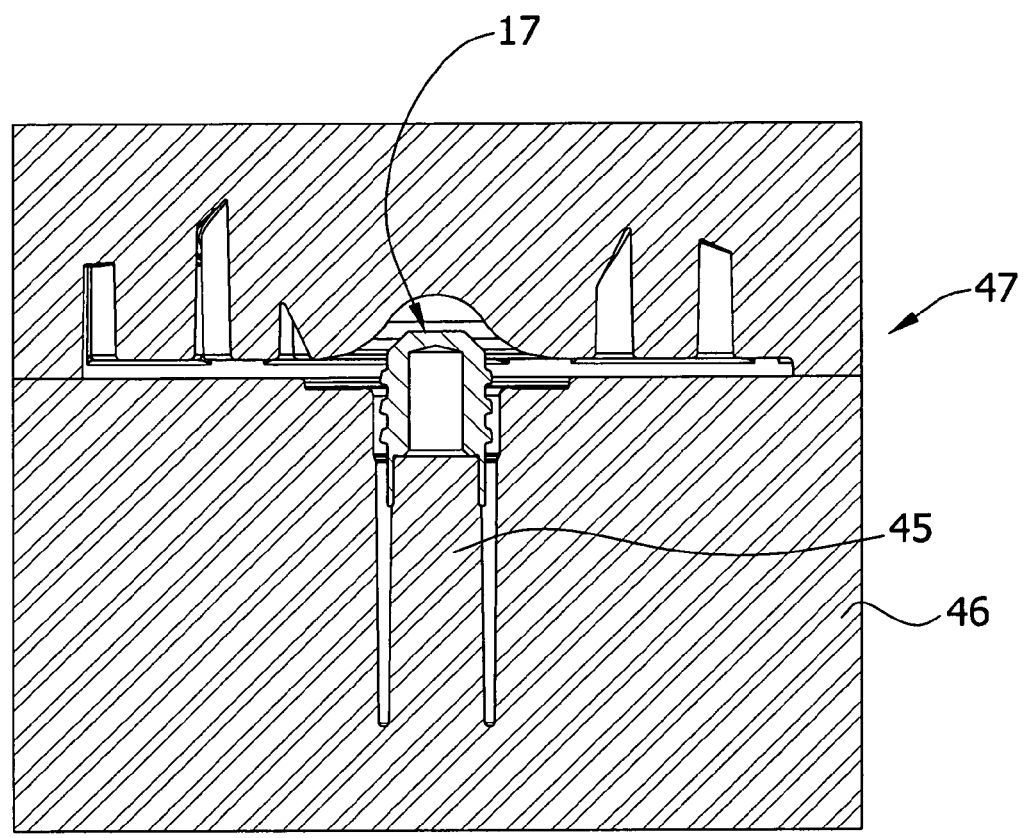
FIG. 8 is a section view of a mold of one embodiment.

Thereafter, the impeller assembly may be installed inside a pump housing, such as the housing 51 shown in FIGS. 6 and 7. In this embodiment, a stationary seal 53 and a rotary seal 55 are placed around the tube 25 for sealing between the impeller 13 and the housing 51. The seals are designed to prevent fluid flow to the motor, e.g., through an opening 57 in the housing. Many other seal configurations are contemplated within the scope of the invention. The housing shown has two sections, though many other configurations are contemplated. The assembly is also mated with a shaft, e.g., drive shaft DS shown in FIG. 7, by placing the insert over the shaft and mating the internal threads of the insert with the external threads on the shaft.

The insert 17 of this embodiment is also advantageous for at least some of the following reasons. The sleeve 39 of the insert 17 accurately locates the insert during molding (e.g., injection molding). The arrangement reduces the tolerance build-up or "stack". The pin of the mold is precisely located against the sleeve 39 of the insert 17. In particular, the shoulder 41 forms the reference plane P off of which the other features of the assembly 11 are formed. Because the pin of the mold is shaped like the driveshaft, the impeller assembly 11 fits precisely on the shaft. The sleeve 39 also serves as an inspection feature for incoming part inspection. For example, the reference plane P can be used to check the location of other features during inspection. Moreover, the sleeve 39 eliminates the need to thread the insert 17 onto and off of the pin prior to and after the molding process. The sleeve 39 only needs to be slipped over the pin, which makes production quicker and cheaper.

The alignment of the impeller-shaft assembly 11 is controlled by the fit of the sleeve 39 of the insert 17 with respect to the shaft extension. In particular, the internal diameter of the sleeve 39 controls concentricity and thus controls eccentricity or "wobble", especially at the outer edges of the impeller, and the shoulder 41 controls perpendicularity. Accordingly, the size and shape of the sleeve 39 is tightly controlled, e.g., the diameter is controlled to within about 0.001 inches or even about 0.0006 inches.

By tightly controlling alignment, the insert 17 eliminates the need to machine the impeller, in particular the inlet 27 and more generally the outer diameter of the impeller. Such machining has been done in the past to prevent contact of the inlet with the housing at gap G. The insert 17 also allows the gap G to be minimized because there is no eccentricity, i.e., the impeller axis will be substantially coaxial with that of the insert and the driveshaft. Therefore, the insert 17 also may eliminate the need to add a seal between the impeller and the housing, e.g., where the gap G was too large around prior art impeller assemblies. The insert 17 also extends the life of the seals 53, 55. By controlling concentricity and thus "wobble" of the impeller, the seals are not worn as quickly. Note that in the prior art where the impeller would move radially relative to the housing, the seals were stressed on each rotation. In this embodiment, the insert, impeller and housing are all co-axial, the insert and impeller rotating concentrically without wobble. In this way, there is reduced or no radial movement of the impeller within the housing so that rotation of the impeller does not stress or wear any seals (e.g., seals 53, 55) between the impeller and the housing.

The insert 17 and impeller 13 may be formed of a variety of materials. In one embodiment, the impeller 13 is made of a molded plastic, and the insert 17 is made of a metal, e.g., brass, powder metal or steel. The metal may be chosen based on the material of the driveshaft DS, for example.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense. For example, the impeller is suitably formed over the insert by over-molding, but other methods of forming the impeller are contemplated. The insert may have many other configurations within the scope of the invention. For example, the nose of the insert need not extend into the hub, its shape may be other than cylindrical, and the bore could be open at both ends. These are merely some examples of possible changes to the constructions described above. Also, the various constructions need not necessarily have all the various advantages listed herein.

What is claimed is:

1. An impeller assembly comprising:
a molded impeller;
an insert within the impeller; and
a blind bore extending generally axially from an end of the insert, the blind bore including an unthreaded portion extending from an open end of the blind bore to an intermediate location between the open end and a closed end of the blind bore, and a threaded portion extending from the intermediate location toward the closed end of the blind bore,
the unthreaded portion of the blind bore having an unthreaded interior surface and a shoulder adjacent the threaded portion, the unthreaded interior surface having a diameter greater than a diameter of the threaded portion, the unthreaded portion being sized and shaped to receive a positioning pin of a mold for positioning the insert in the mold, wherein the shoulder includes a nonplanar surface and a planar contact surface for contacting a tip of the positioning pin when the pin is received in the blind bore, the contact surface being spaced radially from the unthreaded interior surface by the nonplanar surface and lying in a plane extending lateral to the bore axis.

2. The assembly of claim 1 wherein the planar contact surface of the shoulder forms a reference plane to facilitate inspection.

3. The assembly of claim 1 wherein the insert is cylindrical.

4. The assembly of claim 3 wherein the insert includes an outer cylindrical surface having protrusions extending therefrom.

5. The assembly of claim 1 wherein the impeller includes a tube and a hub, and the insert is disposed within the hub and the tube.

6. The assembly of claim 5 in combination with a drive shaft, the drive shaft extending into the tube and into the insert.

7. The assembly of claim 5 wherein the shaft includes external threads engaging the threaded portion of the insert.

8. The assembly of claim 1 wherein the unthreaded portion of the blind bore is concentric with the impeller.

9. The assembly of claim 1 in combination with a housing and further comprising a seal mounted between the impeller and the housing, the insert and impeller being concentric and coaxial so as to reduce wear of the seal during rotation of the impeller relative to the housing.

10. An impeller assembly comprising:

an impeller;

a generally cylindrical insert mounted within the impeller for transmitting force to the impeller;

a blind bore defining an imaginary axis of the insert, an outer surface and a plurality of generally elongate protrusions protruding outward from the outer surface and engaging portions of the impeller, the blind bore including an unthreaded portion extending from an open end of the blind bore to an intermediate location between the open end and a closed end of the blind bore, and a threaded portion extending from the intermediate location toward the closed end of the blind bore, the unthreaded portion of the blind bore having an unthreaded interior surface and a shoulder adjacent the threaded portion, the unthreaded interior surface having a diameter greater than a diameter of the threaded portion, the unthreaded portion being sized and shaped to receive a positioning pin of a mold for positioning the insert in the mold, wherein the shoulder includes a nonplanar surface and a planar contact surface for contacting a tip of the positioning pin when the pin is received in the blind bore, the contact surface being spaced radially from the unthreaded interior surface by the nonplanar surface and lying in a plane extending lateral to the bore axis;

each protrusion extending partially around a circumference of the insert and lying in a plane generally transverse to the imaginary axis of the insert, each protrusion having opposite longitudinal ends engaging the impeller; and wherein the protrusions are sized and shaped to inhibit withdrawal of the insert from the impeller.

11. The impeller assembly of claim 10 wherein the protrusions have no surfaces angled relative to the axis of the insert so as to prevent an axial force from being transmitted to the impeller.

12. The impeller assembly of claim 10 wherein the protrusions include a plurality of pairs of protrusions, each pair being generally aligned along a cross-sectional circumference of the insert, wherein the pairs are spaced from one another along the axis of the insert to inhibit withdrawal of the insert.

13. The impeller assembly of claim 1 wherein the nonplanar surface of the shoulder is contiguous with the unthreaded interior surface and is positioned between the contact surface and the unthreaded interior surface.

* * * * *